United States Patent
Xie et al.

(10) Patent No.: US 8,747,606 B2
(45) Date of Patent: Jun. 10, 2014

(54) METHOD OF FORMING AN ADHESIVE BOND

(75) Inventors: Tao Xie, Troy, MI (US); Hamid G. Kia, Bloomfield Hills, MI (US); William R. Rodgers, Bloomfield Township, MI (US); Man Zhang, Wilmington, DE (US); Chen-Shih Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 263 days.

(21) Appl. No.: 13/076,921

(22) Filed: Mar. 31, 2011

(65) Prior Publication Data

US 2012/0247666 A1 Oct. 4, 2012

(51) Int. Cl.
*B32B 37/00* (2006.01)
*B29C 65/00* (2006.01)

(52) U.S. Cl.
USPC .................... 156/331.1; 156/307.1; 156/325

(58) Field of Classification Search
USPC ......... 156/160, 229, 311, 312, 325, 326, 329, 156/330, 331.4, 33.7, 331.1, 331.7, 306.6, 156/307.1, 327
See application file for complete search history.

(56) References Cited

U.S. PATENT DOCUMENTS

| | | | |
|---|---|---|---|
| 3,984,516 A * | 10/1976 | Carrow | 264/230 |
| 4,548,996 A | 10/1985 | Donermeyer et al. | |
| 4,581,410 A | 4/1986 | Donermeyer et al. | |
| 5,667,580 A * | 9/1997 | Babler | 106/499 |
| 5,672,400 A | 9/1997 | Hansen et al. | |
| 7,811,405 B2 | 10/2010 | Basu et al. | |
| 2004/0167295 A1* | 8/2004 | Kleineberg et al. | 525/437 |
| 2004/0231790 A1 | 11/2004 | Hou et al. | |
| 2009/0056868 A1* | 3/2009 | Basu et al. | 156/295 |
| 2009/0246548 A1 | 10/2009 | Hou et al. | |

FOREIGN PATENT DOCUMENTS

DE 3942046 A1 * 6/1991

OTHER PUBLICATIONS

Machine translation of DE 3942046 date unknown.*
"Polymer Types" from ami.ac.uk as captured by archive.org on Oct. 3, 2006.*
"Poly(ethylene-co-vinyl acetate)" from SigmaAldrich.com date unknown.*
Page 149 "17.4 Curing of Thermosetting Adhesives" from "Handbook of plastics joining: a practical guide" by Troughton 2008.*

* cited by examiner

*Primary Examiner* — John Goff
(74) *Attorney, Agent, or Firm* — Quinn Law Group, PLLC

(57) ABSTRACT

A method of forming an adhesive bond between a first substrate and a second substrate includes applying a semi-crystalline polymeric adhesive composition to a bonding area of the first substrate, and, after applying, disposing the second substrate adjacent to and in contact with the composition to form a workpiece. After disposing, the method includes heating the workpiece to cure the composition and thereby form a crosslinked polymeric adhesive material. After heating, the method includes cooling the workpiece such that the material has a crystalline molecular structure. Concurrent to cooling, the method includes imposing a stress on the material to thereby orient the crystalline molecular structure in a desired direction, and, after imposing, dissipating the stress along the crystalline molecular structure in the desired direction to thereby form the adhesive bond between the first substrate and the second substrate.

19 Claims, 2 Drawing Sheets

METHOD OF FORMING AN ADHESIVE BOND

TECHNICAL FIELD

The present disclosure generally relates to the bonding of substrates, and more specifically, to a method of forming an adhesive bond between substrates.

BACKGROUND

Manufactured articles often include complementary inner and outer panels that are adhesively bonded at peripheral surfaces. For example, automotive vehicle body structures such as doors, hoods, decklids, and tailgates, and electronic structures such as circuit boards, often include a first substrate adhesively bonded to a second substrate. When the substrates are both formed from metal, the first substrate may be welded to the second substrate. However, when at least one of the substrates is formed from a polymeric material, such as a fiber-reinforced polymeric material, the two substrates may be adhesively bonded by heating and curing an adhesive that is sandwiched between the two substrates. Such heating and subsequent cooling of the adhesively bonded substrates may cause surface deformation or distortion of the substrates, i.e., bond-line read out, at the location of the adhesive due to differing rates of thermal expansion between the substrates and the adhesive.

SUMMARY

A method of forming an adhesive bond between a first substrate and a second substrate includes applying a semi-crystalline polymeric adhesive composition to a bonding area of the first substrate. The semi-crystalline polymeric adhesive composition has a semi-crystalline molecular structure, a crystallization temperature, and a curing temperature that is greater than the crystallization temperature. The method also includes, after applying, disposing the second substrate adjacent to and in contact with the semi-crystalline polymeric adhesive composition to form a workpiece, wherein the semi-crystalline polymeric adhesive composition is sandwiched between the first substrate and the second substrate. After disposing, the method includes heating the workpiece to a first temperature that is greater than or equal to the curing temperature to cure the semi-crystalline polymeric adhesive composition and thereby form a crosslinked polymeric adhesive material. After heating, the method includes cooling the workpiece to a second temperature that is less than or equal to the crystallization temperature such that the crosslinked polymeric adhesive material has a crystalline molecular structure. Concurrent to cooling, the method includes imposing a stress on the crosslinked polymeric adhesive material to thereby orient the crystalline molecular structure in a desired direction, and after imposing, dissipating the stress along the crystalline molecular structure in the desired direction to thereby form the adhesive bond between the first substrate and the second substrate.

In one embodiment, the first substrate has a first external surface spaced opposite the bonding area and having a first original shape. Further, the second substrate has a second external surface spaced opposite the bonding area and having a second original shape. In addition, the semi-crystalline polymeric adhesive composition includes a reaction product of a reactant and a crosslinking agent reactive with the reactant. The method includes, after disposing, heating the workpiece to a first temperature that is greater than or equal to the curing temperature such that the reactant reacts with and is crosslinked by the crosslinking agent to thereby form a crosslinked polymeric adhesive material. The method also includes maintaining each of the first original shape and the second original shape so that each of the first external surface and the second external surface is substantially free from distortion after cooling.

In another embodiment, the semi-crystalline polymeric adhesive composition includes a reaction product of a reactant, a plurality of polymeric particles each having a semi-crystalline molecular structure and dispersed within the reactant, and a crosslinking agent reactive with at least one of the reactant and the plurality of polymeric particles. The method includes, after disposing, heating the workpiece to a first temperature that is greater than or equal to the curing temperature such that at least one of the reactant and the plurality of polymeric particles reacts with and is crosslinked by the crosslinking agent to thereby form a crosslinked polymeric adhesive material.

The above features and other features and advantages of the present disclosure are readily apparent from the following detailed description of the best modes for carrying out the disclosure when taken in connection with the accompanying drawings.

DETAILED DESCRIPTION

Figure 1:
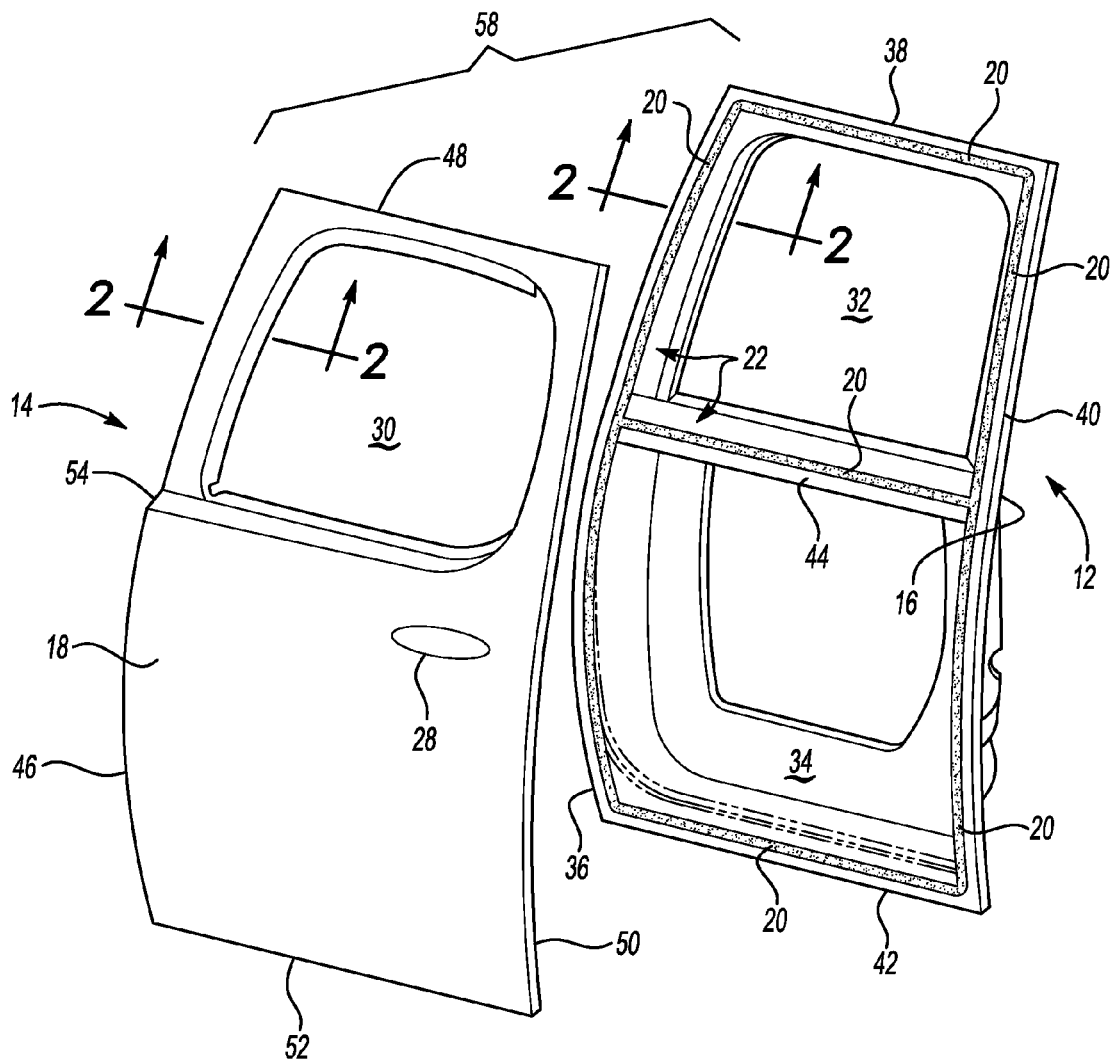
FIG. 1 is a schematic exploded perspective illustration of a semi-crystalline polymeric adhesive composition disposed on a first substrate that is spaced apart from a second substrate in preparation for forming an adhesive bond between the first substrate and the second substrate.

Referring to the Figures, wherein like reference numerals refer to like elements, a method of forming an adhesive bond 10 (FIGS. 2 and 3) between a first substrate 12 (FIG. 1) and a second substrate 14 (FIG. 1) is described herein. The method may be useful for applications requiring adhesively bonded substrates 12, 14 that are substantially free from surface deformation and/or distortion, i.e., bond-line read out. As used herein, the terminology "bond-line read out" refers to a distortion or deformation that is visible from a respective first external surface 16 (FIG. 1) and/or a second external surface 18 (FIG. 1) after the adhesive bond 10 is formed between the first and second substrates 12, 14. That is, bond-line read out may be visible as a deformation and/or distortion of the first and/or second external surface 16, 18. As such, the method described herein may be useful for applications requiring adhesively bonded substrates 12, 14 that are substantially free from deformation and/or distortion after bonding, such as, but not limited to, automotive applications such as doors, hoods, decklids, and tailgates, and electronic applications such as circuit boards. However, the method may also be useful for non-automotive and non-electronic applications including construction and aviation applications.

Referring now to FIG. 1, the method includes applying a semi-crystalline polymeric adhesive composition 20 to a bonding area 22 of the first substrate 12. The semi-crystalline polymeric adhesive composition 20 may be capable of crosslinking to form a thermoset, as set forth in more detail below. As used herein, the terminology "thermoset" refers to a material that is capable of becoming permanently hard and rigid when heated, cured, and cooled. Thermoset materials may be crosslinked. As used herein, the terminology "crosslinked" refers to bonds that link one polymer chain of a polymeric material to another polymer chain to form a three-dimensional network of connected molecules. In contrast, a thermoplastic material may be repeatedly liquefied when heated and hardened again when cooled. Thermoplastic materials may not be crosslinked. Further, the terminology "semi-crystalline" refers to a material having a partially amorphous molecular structure and a partially crystalline molecular structure. That is, semi-crystalline materials exhibit at least some crystalline behavior, e.g., a crystalline melting temperature. In general, semi-crystalline materials have both a melting temperature, $T_m$, i.e., a temperature at which attractive intermolecular forces are overcome, and one or more glass transition temperatures, $T_g$, i.e., a temperature above which localized molecular flexibility increases.

The semi-crystalline polymeric adhesive composition 20 has a semi-crystalline molecular structure, a crystallization temperature, and a curing temperature that is greater than the crystallization temperature. The crystallization temperature represents the temperature at or below which the semi-crystalline polymeric adhesive composition 20 crystallizes. That is, the crystallization temperature is the temperature at which a disorder-to-order phase transition occurs in materials having a semi-crystalline molecular structure. Further, the curing temperature represents the temperature at or above which the semi-crystalline polymeric adhesive composition 20 cures, i.e., crosslinks, to form a crosslinked polymeric adhesive material 24 (FIGS. 2 and 3), as set forth in more detail below.

The semi-crystalline polymeric adhesive composition 20 may also exhibit adhesive properties when cured. That is, after curing, the crosslinked polymeric adhesive material 24 may adhere to the first and second substrates 12, 14 so as to bond the first substrate 12 to the second substrate 14. Suitable examples of semi-crystalline polymeric adhesive compositions 20 and the resulting crosslinked polymeric adhesive materials 24 may include polymeric materials such as, but not limited to, polyethylene, polypropylene, poly (vinyl chloride), polyamides, polyesters, poly (ethylene-co-vinyl acetates), and polyurethanes. In particular, the semi-crystalline polymeric adhesive composition 20 may be selected from the group of polyethylene, polypropylene, poly(vinyl chloride), polyamides, polyesters, poly (ethylene-co-vinyl acetates), polyurethanes, and combinations thereof, as set forth in more detail below.

In one non-limiting embodiment, the semi-crystalline polymeric adhesive composition 20 may include a reaction product of a reactant and a crosslinking agent reactive with the reactant. As used herein, the terminology "crosslinking agent" refers to a material that is capable of reacting with another material to crosslink the other material. That is, a crosslinking agent promotes or regulates bonding between polymer chains of a polymeric material so as to link polymer chains together to create a rigid structure. In one example, the reactant may be poly(ethylene-co-vinyl acetate) and the crosslinking agent may be dicumyl peroxide. In another example, the reactant may have a hydroxyl functional group and the crosslinking agent may be an isocyanate. For example, the reactant may include diol and/or triol functionality and the crosslinking agent may be a diisocyanate and/or a triisocyanate. That is, as set forth in more detail below, the reactant may be a liquid polymer precursor. Therefore, the method may further include selecting a ratio of an amount of the reactant to an amount of the crosslinking agent present in the semi-crystalline polymeric adhesive composition 20. The ratio may be selected according to a desired crosslinking density and/or molecular crystallinity of the semi-crystalline polymeric adhesive composition 20 after curing, as set forth in more detail below.

Figure 3:
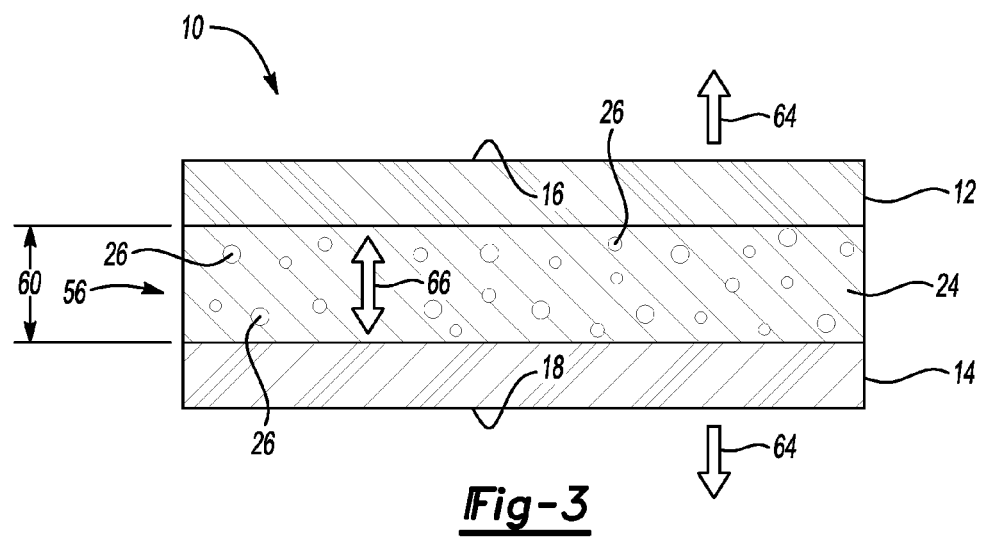
FIG. 3 is a schematic cross-sectional illustration of another embodiment of the crosslinked polymeric adhesive material of FIG. 2.

In another non-limiting embodiment described with reference to FIGS. 1 and 3, the semi-crystalline polymeric adhesive composition 20 (FIG. 1) may include a reaction product of the reactant, a plurality of polymeric particles 26 (FIG. 3) each having a semi-crystalline molecular structure and dispersed within the reactant, and the crosslinking agent reactive with at least one of the reactant and the plurality of polymeric particles 26. In this embodiment, the reactant may be, for example, a liquid polymer precursor, and the plurality of polymeric particles 26 may be dispersed throughout the liquid polymer precursor. Although other shapes are contemplated, as an example, each of the plurality of polymeric particles 26 may have a substantially spherical shape as shown in FIG. 3, and may include a functional group reactive with the crosslinking agent. That is, the plurality of particles 26 may include surface functionality. For example, at least one of the reactant and the plurality of particles 26 may have a hydroxyl functional group, and the crosslinking agent may be an isocyanate, such as a triisocyanate. As set forth above, each of the plurality of particles 26 may have the semi-crystalline molecular structure, and may therefore impart a semi-crystalline molecular structure to the semi-crystalline polymeric adhesive composition 20 (FIG. 1) of this embodiment.

Referring again to FIG. 1, by way of a non-limiting example, the first substrate 12 may be an inner panel of a vehicle door, and the second substrate 14 may be an outer panel of the vehicle door. The first substrate 12 may have the first external surface 16 spaced opposite the bonding area 22 and having a first original shape. Likewise, the second substrate 14 may have the second external surface 18 spaced opposite the bonding area 22 and having a second original shape. As shown in FIG. 1, the second substrate 14 may be molded to define a top-to-bottom curvature of a side of a vehicle (not shown), one or more voids 28 for a handle assembly (not shown) configured for opening and closing the vehicle door, and a framed in window opening 30. The first substrate 12 may therefore be molded to complement the shape of the second substrate 14, and may define a corresponding window opening 32 and a compartment (shown generally at 34) configured for housing a window retraction mechanism (not shown), structural reinforcement elements (not shown), electronic wiring and components (not shown), and the like.

As shown in FIG. 1, for this example, the bonding area 22 may include one or more peripheral flanges 36, 38, 40, 42 and a belt line region 44 each configured for mating with a corresponding flange 46, 48, 50, 52 and corresponding belt line region 54 of the second substrate 14. The respective peripheral flanges 36, 38, 40, 42, 46, 48, 50, 52 and belt line regions 44, 54 may each have a uniform thickness, e.g., about 5 mm, and may provide respective engaging surfaces for adhesively bonding the first substrate 12 and the second substrate 14.

The method may include forming at least one of the first substrate 12 and the second substrate 14 from a fiber-reinforced polymeric material, such as a glass fiber-reinforced polymeric material. For example, the method may include forming at least one of the first substrate 12 and the second substrate 14 from a sheet molding compound. Therefore, one or both of the first substrate 12 and the second substrate 14 may be formed from a glass fiber-reinforced sheet molding compound.

With continued reference to FIG. 1, for the method, the first substrate 12 may be initially spaced apart from the second substrate 14 before the semi-crystalline polymeric adhesive composition 20 is applied to the bonding area 22. The semi-crystalline polymeric adhesive composition 20 may be applied to the bonding area 22 of the first substrate 12 in any manner. For example, the semi-crystalline polymeric adhesive composition 20 may be applied via a nozzle (not shown) of an adhesive application gun. Alternatively, the semi-crystalline polymeric adhesive composition 20 may be spread onto the bonding area 22 of the first substrate 12, e.g., via a blade (not shown). Further, the semi-crystalline polymeric adhesive composition 20 may be applied by hand or by a machine, e.g., a computer-controlled robot. Generally, the semi-crystalline polymeric adhesive composition 20 may be applied as, for example, a strip, band, or bead in a predetermined pattern to the bonding area 22 at a suitable thickness. That is, the semi-crystalline polymeric adhesive composition 20 may be applied to the bonding area 22 so that when the first substrate 12 and the second substrate 14 are pressed together against the semi-crystalline polymeric adhesive composition 20, an adhesive layer (shown generally at 56 in FIGS. 2 and 3) of desired thickness and substantially uniform cross-section is formed, as set forth in more detail below.

That is, with continued reference to FIG. 1, the method also includes, after applying, disposing the second substrate 14 adjacent to and in contact with the semi-crystalline polymeric adhesive composition 20 to form a workpiece 58 wherein the semi-crystalline polymeric adhesive composition 20 is sandwiched between the first substrate 12 and the second substrate 14. Although not shown, the resulting workpiece 58 may be held in place by, for example, a jig, workholding device, or other fixture.

Figure 2:
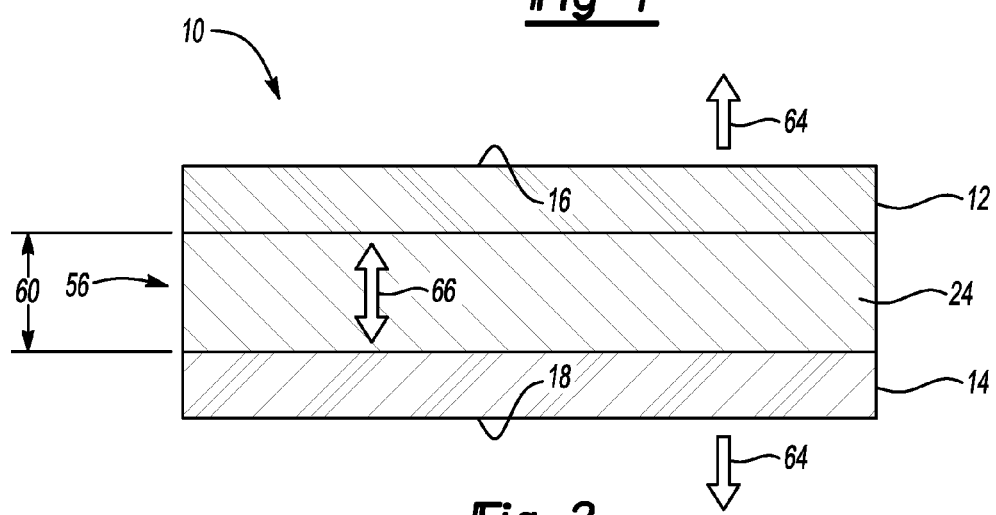
FIG. 2 is a schematic cross-sectional illustration of a crosslinked polymeric adhesive material sandwiched between the first substrate and the second substrate of FIG. 1, taken along section lines 2-2.

After disposing the second substrate 14 so that the semi-crystalline polymeric adhesive composition 20 is sandwiched between the first substrate 12 and the second substrate 14, the method includes heating the workpiece 58 to a first temperature that is greater than or equal to the curing temperature to cure the semi-crystalline polymeric adhesive composition 20 and thereby form the crosslinked polymeric adhesive material 24 (FIGS. 2 and 3). That is, the crosslinked polymeric adhesive material 24 is formed from the semi-crystalline polymeric adhesive composition 20 after heating the semi-crystalline polymeric adhesive composition 20 to the first temperature, which is at or above the curing temperature. More specifically, heating the workpiece 58 may cause the crosslinking agent to react with the reactant and/or plurality of particles 26 (FIG. 3) to thereby form the crosslinked polymeric adhesive material 24.

That is, the method may include heating the workpiece 58 such that the reactant reacts with and is crosslinked by the crosslinking agent to thereby form the crosslinked polymeric adhesive material 24 (FIGS. 2 and 3). Alternatively, the method may include heating the workpiece 58 such that at least one of the reactant and the plurality of polymeric particles 26 (FIG. 3) reacts with and is crosslinked by the crosslinking agent to thereby form the crosslinked polymeric adhesive material 24. In one non-limiting example, the crosslinked polymeric adhesive material 24 may be crosslinked poly (ethylene-co-vinyl acetate).

Further, as set forth above, the ratio of constituents of the semi-crystalline polymeric adhesive composition 20 (FIG. 1) that forms the crosslinked polymeric adhesive material 24 (FIGS. 2 and 3) may be tailored according to a desired crosslinking density and/or molecular crystallinity of the crosslinked polymeric adhesive material 24.

For the method, the workpiece 58 may be heated in any manner. For example, the workpiece 58 may be baked in an (not shown) or heated in another manner, e.g., by induction heating. After heating, the crosslinked polymeric adhesive material 24 is therefore crosslinked upon curing and forms the adhesive layer 56 (FIGS. 2 and 3) between the first substrate 12 and the second substrate 14. The adhesive layer 56 formed from the crosslinked polymeric adhesive material 24 may have a thickness 60 (FIGS. 2 and 3) of from about 0.5 mm to about 2 mm, e.g., about 1 mm.

Referring again to the method, after heating, the method includes cooling the workpiece 58 (FIG. 1) to a second temperature that is less than or equal to the crystallization temperature such that the crosslinked polymeric adhesive material 24 (FIGS. 2 and 3) has the crystalline molecular structure. That is, as the workpiece 58 is cooled to at or below the crystallization temperature of the polymeric adhesive material 24 formed from the semi-crystalline polymeric adhesive composition 20 (FIG. 1), the crosslinked polymeric adhesive material 24 crystallizes to form the crystalline molecular structure.

Figure 4:
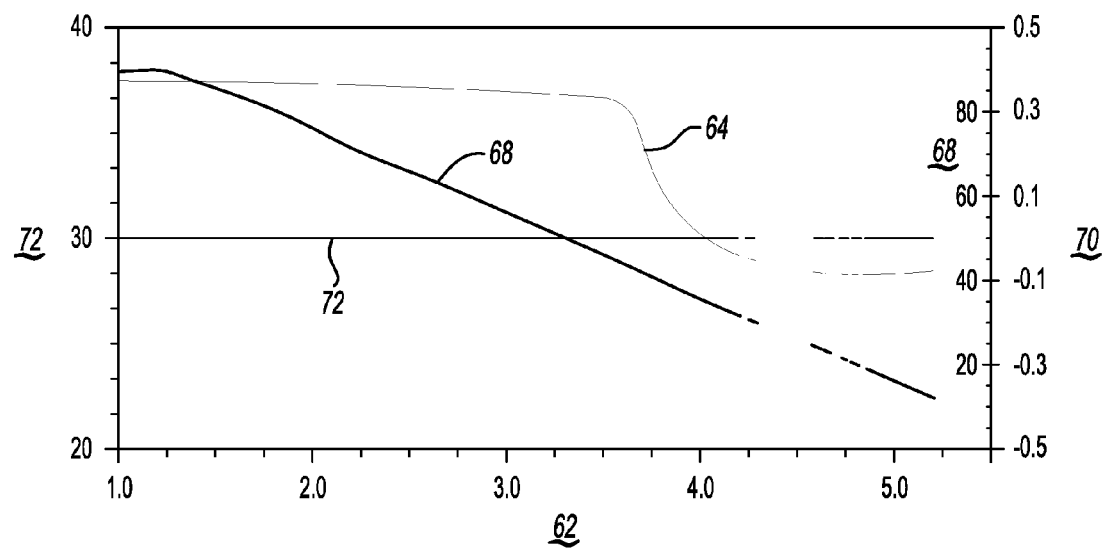
FIG. 4 is a graphical representation of a relationship between stress, strain, time, and temperature for the crosslinked polymeric adhesive material of Example 1.

The workpiece 58 may be cooled in any manner for any time period 62 (FIG. 4). For example, the workpiece 58 may be removed from the aforementioned oven (not shown) after heating, and cooled in ambient air for about 1 hour. Alternatively, the workpiece 58 may be chilled to the second temperature. Further, a difference between the crystallization temperature and the curing temperature may be less than or equal to about 50° C. That is, the crystallization temperature may not be significantly lower than the curing temperature. However, if the workpiece 58 is subjected to larger heating/cooling cycles during subsequent manufacturing operations, the crystallization temperature and the curing temperature may each be tailored by selecting the ratio of constituents of the semi-crystalline polymeric adhesive composition 20.

Concurrent to cooling, the method also includes imposing a stress (denoted generally by arrows 64 in FIGS. 2 and 3 and line 64 in FIG. 4) on the crosslinked polymeric adhesive material 24 to thereby orient the crystalline molecular structure in a desired direction (denoted generally by arrow 66 in FIGS. 2 and 3). The stress 64 may be a thermal stress imposed during the heating and subsequent cooling of the workpiece 58 (FIG. 1). That is, each of the first substrate 12, the crosslinked polymeric adhesive material 24, and the second substrate 14 may have a respective rate of thermal expansion during cooling. Stated differently, each of the first substrate 12, the crosslinked polymeric adhesive material 24, and the second substrate 14 may have a different coefficient of thermal expansion and may attempt to contract during cooling at a different rate as compared to an adjacent component. For example, the crosslinked polymeric adhesive material 24 may attempt to contract more than each of the first substrate 12 and the second substrate 14. Such uneven contraction creates a tension, i.e., the stress 64, on the crosslinked polymeric adhesive material 24. The tensile stress 64 on the semi-crystalline structure of the semi-crystalline polymeric adhesive composition 20 induces preferential alignment of the crystalline molecular structure in the desired direction 66. Such preferential alignment of the crystalline molecular structure substantially eliminates or significantly reduces the stress 64, as set forth in more detail below.

Since the crosslinked polymeric adhesive material 24 is sandwiched between and adhered to each of the first substrate 12 and the second substrate 14 as shown in FIGS. 2 and 3, such differing rates of thermal expansion may impose the stress 64 (FIGS. 2-4) on the crosslinked polymeric adhesive material 24. The stress 64 may be an interfacial tensile stress and may be imposed or induced as the first substrate 12 and the second substrate 14 contract at a different rate than the crosslinked polymeric adhesive material 24. Since the stress 64 is imposed concurrent to cooling and crystallization, the aforementioned stress 64 therefore cause the crystalline molecular structure of the crosslinked polymeric adhesive material 24 to orient in the direction 66 (FIGS. 2 and 3) of the stress 64. That is, concurrent to the imposition of stress 64 due to cooling, the crosslinked polymeric adhesive material 24 crystallizes and preferentially orients the crystalline molecular structure in the desired direction 66. Therefore, during cooling, the aforementioned thermal mismatch due to a difference in respective coefficients of thermal expansion of the first substrate 12, the second substrate 14, and the crosslinked polymeric adhesive material 24 causes and imposes the stress 64. The stress 64 in turn orients the crystalline molecular structure in the desired direction 66. For example, the crystalline molecular structure may be anisotropically oriented. Such cooling and concurrent imposition of stress 64 to thereby orient the crystalline molecular structure minimizes the stress 64 in the adhesive bond 10 between the first substrate 12 and the second substrate 14.

After imposing the stress 64 (FIGS. 2-4) to thereby orient the crystalline molecular structure, the method includes dissipating the stress 64 along the crystalline molecular structure in the desired direction 66 (FIGS. 2 and 3) to thereby form the adhesive bond 10 (FIGS. 2 and 3) between the first substrate 12 and the second substrate 14. That is, as shown in FIG. 4, the stress 64 may be dissipated along the crystalline molecular structure in the desired direction 66 so that the stress 64 disappears as the crosslinked polymeric adhesive material 24 is cooled to the second temperature, which is at or below the crystallization temperature. Therefore, the method substantially reduces and/or eliminates the stress 64 caused by the heating and subsequent cooling of the crosslinked polymeric adhesive material 24.

Therefore, referring again to FIG. 1, the method may further include maintaining the first original shape so that the first external surface 16 is substantially free from distortion after cooling. Likewise, the method may further include maintaining the second original shape so that the second external surface 18 is substantially free from distortion after cooling. The method therefore minimizes and/or eliminates bond-line read out since the adhesive bond 10 is formed between the first substrate 12 and the second substrate 14 without deforming and/or distorting the respective first and second external surfaces 16, 18. Stated differently, the adhesive bond 10 is not visible on the first and second external surfaces 16, 18. Therefore, a thickness (not shown) of each of the first substrate 12 and the second substrate 14 may be reduced during design and formation of the workpiece 58. That is, it is not necessary to increase the thickness of the first and second substrates 12, 14 during design and manufacturing of the workpiece 58 to compensate for bond-line read out.

The following example is meant to illustrate the disclosure and is not to be viewed in any way as limiting to the scope of the disclosure.

EXAMPLE

To form a crosslinked polymeric adhesive material of Example 1, a semi-crystalline polymeric adhesive composition is prepared by reacting component A and component B in a ratio of 1 part of component A to 1 part of component B. Component A and component B are reacted at a reaction temperature of 170° C. to form the crosslinked polymeric adhesive material of Example 1, i.e., crosslinked poly(ethylene-co-vinyl acetate). The crystallization temperature of the semi-crystalline polymeric adhesive composition is 40° C. Below the crystallization temperature, the crosslinked polymeric adhesive material has a crystalline molecular structure.

Component A is poly(ethylene-co-vinyl acetate) and includes vinyl acetate in an amount of 40 parts by weight based on 100 parts by weight of the poly(ethylene-co-vinyl acetate). Component A has a melt index of 57 g/10 min (190° C./2.16 kg) and a semi-crystalline molecular structure. Component A is commercially available from Sigma-Aldrich Co. of St. Louis, Mo.

Component B is dicumyl peroxide having a density of 1.56 g/mL at 25° C. and a number average molecular weight of 270.37 g/mol. Component B is commercially available from Sigma-Aldrich Co. of St. Louis, Mo.

As described with reference to FIG. 4, the resulting crosslinked polymeric adhesive material of Example 1 is subjected to thermal mechanical testing. In particular, the crosslinked polymeric adhesive material is heated to a temperature 68 (FIG. 4) of 90° C. After heating, the crosslinked polymeric adhesive material is cooled to a temperature 68 of 15° C. over a time period 62 of about 1 hour while a stress 64 corresponding to a tensile force 70 of 0.4 N is imposed on the crosslinked polymeric adhesive material to produce a strain 72 of 30%. That is, the strain 72 is produced and maintained on the crosslinked polymeric adhesive material of Example 1 while the crosslinked polymeric adhesive material is cooled from 90° C. to 15° C.

As shown in FIG. 4, the stress 64 corresponding to the tensile force 70 is minimized and/or eliminated as the crosslinked polymeric adhesive material is cooled to at or below the crystallization temperature of 40° C. Accordingly, without intending to be limited by theory, after cooling and concurrent imposition of the stress 64, the stress 64 is dissipated along the crystalline molecular structure. Therefore, after cooling, the tensile force 70 and stress 64 are no longer necessary to maintain the elongation of the crosslinked polymeric adhesive material since the crystalline molecular structure is oriented so as to dissipate the stress 64. Therefore, the crosslinked polymeric adhesive material of Example 1 formed from the semi-crystalline polymeric adhesive composition may reduce any interfacial tensile stress 64 imposed during cooling of the crosslinked polymeric adhesive material.

While the best modes for carrying out the disclosure have been described in detail, those familiar with the art to which this disclosure relates will recognize various alternative designs and embodiments for practicing the disclosure within the scope of the appended claims.

The invention claimed is:

1. A method of forming an adhesive bond between a first substrate and a second substrate, the method comprising:
    applying a semi-crystalline polymeric adhesive composition to the first substrate;
    wherein the first substrate has a first external surface and a bonding area spaced opposite the first external surface, and wherein the second substrate has a second external surface;
    wherein the semi-crystalline polymeric adhesive composition has a semi-crystalline molecular structure, a crystallization temperature, and a curing temperature that is greater than the crystallization temperature;

after applying, disposing the second substrate adjacent to and in contact with the semi-crystalline polymeric adhesive composition to form a workpiece wherein the semi-crystalline polymeric adhesive composition is sandwiched between the bonding area and the second substrate;

after disposing, heating the workpiece to a first temperature that is greater than or equal to the curing temperature to cure the semi-crystalline polymeric adhesive composition and thereby form a crosslinked polymeric adhesive material;

concurrent to heating, expanding the first substrate at a first rate of thermal expansion, the second substrate at a second rate of thermal expansion, and the crosslinked polymeric adhesive material at a third rate of thermal expansion that is different from the first rate of thermal expansion and the second rate of thermal expansion;

after heating, cooling the workpiece to a second temperature that is less than or equal to the crystallization temperature such that the crosslinked polymeric adhesive material has a crystalline molecular structure;

concurrent to cooling, contracting the first substrate at the first rate of thermal expansion, contracting the second substrate at the second rate of thermal expansion, and contracting the crosslinked polymeric adhesive material at the third rate of thermal expansion to thereby impose a tensile stress on the crosslinked polymeric adhesive material in a direction substantially perpendicular to the first external surface and the second external surface and orient the crystalline molecular structure in the direction; and after contracting, dissipating the tensile stress along the crystalline molecular structure in the direction to thereby form the adhesive bond between the first substrate and the second substrate.

2. The method of claim 1, wherein the first external surface has a first original shape before cooling, and wherein the method further includes maintaining the first original shape so that the first external surface is substantially free from distortion after cooling.

3. The method of claim 2, wherein the second external surface has a second original shape before cooling, and wherein the method further includes maintaining the second original shape so that the second external surface is substantially free from distortion after cooling.

4. The method of claim 1, further including forming at least one of the first substrate and the second substrate from a fiber-reinforced polymeric material.

5. The method of claim 1, further including forming at least one of the first substrate and the second substrate from a sheet molding compound.

6. The method of claim 1, wherein the semi-crystalline polymeric adhesive composition is selected from the group of polyethylene, polypropylene, poly(vinyl chloride), polyamides, polyesters, poly (ethylene-co-vinyl acetates), polyurethanes, and combinations thereof.

7. The method of claim 1, wherein the crosslinked polymeric adhesive material is crosslinked poly(ethylene-co-vinyl acetate).

8. The method of claim 1, wherein a difference between the crystallization temperature and the curing temperature is less than or equal to about 50° C.

9. A method of forming an adhesive bond between a first substrate and a second substrate, the method comprising:

applying a semi-crystalline polymeric adhesive composition to the first substrate;

wherein the semi-crystalline polymeric adhesive composition has a semi-crystalline molecular structure, a crystallization temperature, and a curing temperature that is greater than the crystallization temperature;

wherein the first substrate has a first external surface having a first original shape and a bonding area spaced opposite the first external surface, and wherein the second substrate has a second external surface having a second original shape;

wherein the semi-crystalline polymeric adhesive composition includes a reaction product of a reactant and a crosslinking agent reactive with the reactant;

after applying, disposing the second substrate adjacent to and in contact with the semi-crystalline polymeric adhesive composition to form a workpiece wherein the semi-crystalline polymeric adhesive composition is sandwiched between the bonding area and the second substrate;

after disposing, heating the workpiece to a first temperature that is greater than or equal to the curing temperature such that the reactant reacts with and is crosslinked by the crosslinking agent to thereby form a crosslinked polymeric adhesive material;

concurrent to heating, expanding the first substrate at a first rate of thermal expansion, the second substrate at a second rate of thermal expansion, and the crosslinked polymeric adhesive material at a third rate of thermal expansion that is different from the first rate of thermal expansion and the second rate of thermal expansion;

after heating, cooling the workpiece to a second temperature that is less than or equal to the crystallization temperature such that the crosslinked polymeric adhesive material has a crystalline molecular structure;

concurrent to cooling, contracting the first substrate at the first rate of thermal expansion, the second substrate at the second rate of thermal expansion, and the crosslinked polymeric adhesive material at the third rate of thermal expansion to thereby impose a tensile stress on the crosslinked polymeric adhesive material in a direction substantially perpendicular to the first external surface and the second external surface and orient the crystalline molecular structure in the direction;

after contracting, dissipating the tensile stress along the crystalline molecular structure in the direction to thereby form the adhesive bond between the first substrate and the second substrate; and maintaining each of the first original shape and the second original shape so that each of the first external surface and the second external surface is substantially free from distortion after cooling.

10. The method of claim 9, further including selecting a ratio of an amount of the reactant to an amount of the crosslinking agent present in the semi-crystalline polymeric adhesive composition.

11. The method of claim 10, wherein the reactant is poly (ethylene-co-vinyl acetate).

12. The method of claim 11, wherein the crosslinking agent is dicumyl peroxide.

13. The method of claim 9, further including forming at least one of the first substrate and the second substrate from a glass fiber-reinforced polymeric material.

14. The method of claim 9, further including forming at least one of the first substrate and the second substrate from a sheet molding compound.

15. A method of forming an adhesive bond between a first substrate and a second substrate, the method comprising:

applying a semi-crystalline polymeric adhesive composition to the first substrate;

wherein the first substrate has a first external surface and a bonding area spaced opposite the first external surface, and wherein the second substrate has a second external surface;

wherein the semi-crystalline polymeric adhesive composition includes a reaction product of a reactant, a plurality of polymeric particles each having a semi-crystalline molecular structure and dispersed within the reactant, and a crosslinking agent reactive with at least one of the reactant and the plurality of polymeric particles;

wherein the semi-crystalline polymeric adhesive composition has a semi-crystalline molecular structure, a crystallization temperature, and a curing temperature that is greater than the crystallization temperature;

after applying, disposing the second substrate adjacent to and in contact with the semi-crystalline polymeric adhesive composition to form a workpiece wherein the semi-crystalline polymeric adhesive composition is sandwiched between the bonding area and the second substrate;

after disposing, heating the workpiece to a first temperature that is greater than or equal to the curing temperature such that at least one of the reactant and the plurality of polymeric particles reacts with and is crosslinked by the crosslinking agent to thereby form a crosslinked polymeric adhesive material;

concurrent to heating, expanding the first substrate at a first rate of thermal expansion, the second substrate at a second rate of thermal expansion, and the crosslinked polymeric adhesive material at a third rate of thermal expansion that is different from the first rate of thermal expansion and the second rate of thermal expansion;

after heating, cooling the workpiece to a second temperature that is less than or equal to the crystallization temperature such that the crosslinked polymeric adhesive material has a crystalline molecular structure;

concurrent to cooling, contracting the first substrate at the first rate of thermal expansion, the second substrate at the second rate of thermal expansion, and the crosslinked polymeric adhesive material at the third rate of thermal expansion to thereby impose a tensile stress on the crosslinked polymeric adhesive material in a direction substantially perpendicular to the first external surface and the second external surface and orient the crystalline molecular structure in the direction; and after contracting, dissipating the tensile stress along the crystalline molecular structure in the direction to thereby form the adhesive bond between the first substrate and the second substrate.

16. The method of claim 15, wherein the first external surface has a first original shape before cooling, and wherein the method further includes maintaining the first original shape so that the first external surface is substantially free from distortion after cooling.

17. The method of claim 16, wherein the second external surface has a second original shape before cooling, and wherein the method further includes maintaining the second original shape so that the second external surface is substantially free from distortion after cooling.

18. The method of claim 15, wherein at least one of the reactant and the plurality of particles has a hydroxyl functional group.

19. The method of claim 18, wherein the crosslinking agent is an isocyanate.

* * * * *